May 30, 1950 C. A. DE GIERS ET AL 2,509,629
DEVICE FOR CONTROLLING DISCHARGE RATES FROM TANKS
Filed Dec. 22, 1945
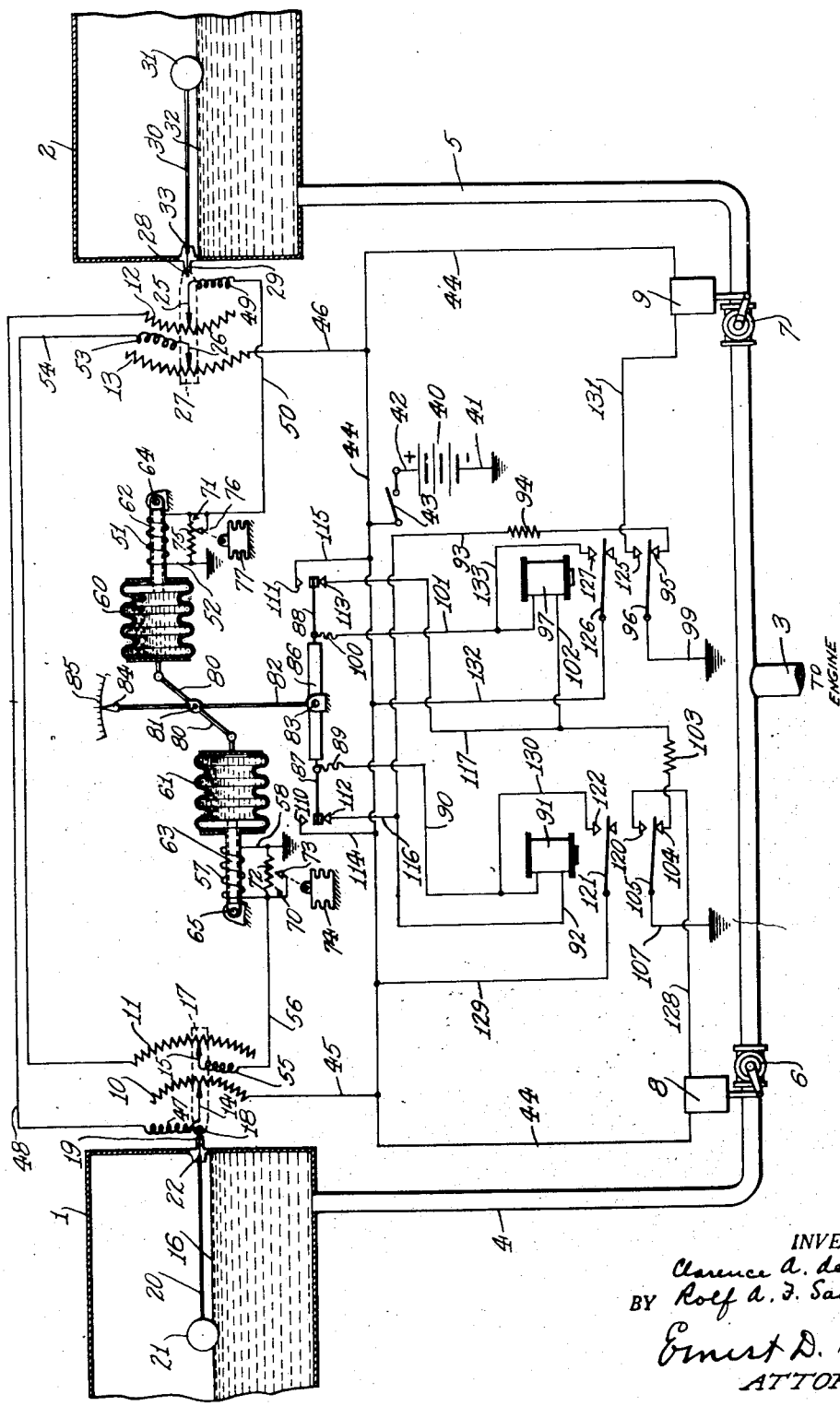
INVENTORS
Clarence A. de Giers
BY Rolf A. F. Sandberg
Ernest D. Given
ATTORNEY

Patented May 30, 1950

2,509,629

UNITED STATES PATENT OFFICE 2,509,629

DEVICE FOR CONTROLLING DISCHARGE RATES FROM TANKS

Clarence A. de Giers, Forest Hills, and Rolf A. F. Sandberg, Queens Village, N. Y., assignors to The Liquidometer Corporation, Long Island City, N. Y., a corporation of Delaware Application December 22, 1945, Serial No. 637,046

13 Claims. (Cl. 222—57)

This invention relates to control devices or systems for controlling the rate of discharge of liquid or other fluid from a plurality of containers, and particularly to control devices or systems for controlling the rate of discharge of fuel from a plurality of tanks on an aircraft.

For certain types of installations and devices in which liquid is drained from a plurality of containers it is of importance that the rate of discharge of liquid from the containers be uniform. The invention may be applied to aircraft such as single motored combat aircraft subjected to considerable and swift maneuvering. Here it is essential that the fuel weight distribution be kept in balance at all times in order to obtain the best performance of the aircraft. In multimotored aircraft, it is also of importance to equalize the unbalance of the tanks which may result from unequal fuel consumption of the engines.

Accordingly, it is one of the objects of the invention to provide a novel and improved control device or system for equalizing the distribution of fuel in several containers or tanks.

Another object of the invention is to provide a novel and improved control device or system for regulating the flow of liquid from one tank corresponding to the liquid contents of one or more other tanks.

Another object of the invention is to provide a novel and improved control device or system which is self-regulating and which automatically maintains substantially uniform contents and hence a weight balance in the various tanks to be supervised.

Another object of the invention is to provide a novel and improved control device or system for the purposes aforesaid, which remains inactive when and while the contents or weight distribution in the tanks to be supervised are in balance and becomes active only when and while such balance is disturbed, such arrangement having the advantage that the control device or system is at rest as long as the weight and contents distribution are in balance, one result being that wear and tear of the movable parts of the control device or system are reduced to a minimum.

Other and further objects, features and advantages of the invention will appear hereinafter and in the appended claims forming part of the application.

In the accompanying drawing the single figure shows a now preferred embodiment of an electrical control device according to the invention, including a circuit diagram, said drawing being an illustration of the specification and not to be construed as imposing limitations on the invention.

A control device as shown in the figure may be successively used wherever it is necessary to control the discharge of liquid from two or more tanks. It is particularly useful to secure the uniform drainage of fuel tanks of combat aircraft. As previously pointed out, it is essential on such aircraft that the fuel weight distribution be kept in balance at all times in order to obtain the best performance from the aircraft when maneuvering.

There are diagrammatically shown in the figure two fuel tanks 1 and 2 which may be the wing tanks of an aircraft and which feed the plane engine (not shown) through a main pipe 3 to which they are connected by feeder pipes 4 and 5 respectively. The rate of flow of fuel from the tanks through pipes 4 and 5 is controlled by conventional valves 6 and 7 respectively. The opening of each valve is controlled by the electromagnets 8, 9 respectively. The energizing circuits of these electromagnets are in turn controlled by a control system according to the invention which will be now described in detail.

With each tank, the drainage of which is to be supervised, there are associated two resistance elements 10, 11 for tank 1 and 12, 13 for tank 2 respectively. Resistance element 10 is engaged by a slider contact 14 and resistance element 11 by a slider contact 15. The position of both slider contacts relative to the respective resistance elements is controlled by the liquid level 16 in tank 1. For the purpose aforesaid, sliders 14 and 15 are mounted on a common insulating support 17 pivotally supported by a pivot 18. Support 17 is operatively connected by a mechanical transmission means 19 to a float arm 20 fastened to a float 21 floating on the liquid, the level 16 of which is to be supervised. Float arm 20 is pivotally supported at pivot 22 by the walls of tank 1. The opening in the tank through which float arm 20 is introduced into the tank may be closed by means of a seal of the bellows type (not shown) permitting a rocking movement of float arm 20 and hence a corresponding angular movement of support 17 in response to a change of the liquid level in the tank. Float and linkage systems as previously described are well known in the art and therefore not illustrated in detail. However, it should be noted in this connection that any suitable, conventional float and linkage system may be employed to control the positions of sliders 14 and 15 relative to the respective resistance elements.

The resistance elements 12 and 13 are slidably engaged by slider contacts 25 and 26 respectively supported on a common support 27. This support is pivotal about a pivot point 28 and connected by a mechanical transmission 29 to a float arm 30 supporting a boat 31 floating on the liquid in tank 2, the level 32 of which is to be supervised. Float arm 30 is pivotally supported at 33 by the walls of tank 2. The opening in the tank walls for float arm 30 may be closed by a seal of the bellows type (not shown).

The control system according to the invention is energized by means of a source of current such as a battery 40. The negative terminal of this battery is grounded by a lead 41 and the positive terminal is connected by a lead 42 and a control switch 43, which is closed during operation of the control system, to a supply lead 44. This supply lead is connected by leads 45 and 46 to one end of resistance elements 10 and 13 respectively. The slider 14 engaging resistance element 10 is connected by a pigtail 47 and a lead 48 to one end of resistance element 12. Slider 25 engaging this resistance element is connected by a pigtail 49 and a lead 50 to one terminal of a heater coil 51, the other terminal of which is grounded by a lead 52. Similarly, slider 26 engaging resistance element 13 is connected by a pigtail 53 and a lead 54 to one end of resistance element 11. The slider 15 engaging this resistance element is connected by a pigtail 55 and a lead 56 to one end of a heater coil 57, the other end of which is grounded by a lead 58. As will now be apparent, an angular movement of support 17 about pivot 18, say for instance in counter clockwise direction in response to a fall of the liquid level in tank 1, will cause an increase of the effective resistance of resistance element 10 and a decrease of the effective resistance of resistance element 11. Correspondingly, an angular movement of support 27 about pivot 28 in response to a fall of the liquid level in tank 2, which will impart a clockwise movement to support 27 due to the reversed arrangement thereof, will cause a decrease of the effective resistance value of resistance element 12 and an increase of the effective resistance of resistance element 13. In other words, a change of the liquid level in the same direction in both tanks will result in an increase of the resistance value of the resistor of one tank and in a decrease of the resistance value of the associated and series-connected resistor at the other tank.

The resistance elements and the rate of transmission of the float and linkage systems at both tanks are so selected that an equal rise or fall of the liquid levels in both tanks will result in an equal increase and decrease of the resistance values of the associated resistors, or in other words, the total resistance values of the resistors remain unchanged. Consequently, the currents through heater coils 51 and 57 will be equal when the liquid levels in both tanks change uniformly. It will further be obvious that the decrease and increase of the resistances of associated resistors will not compensate each other when the liquid levels in both tanks differ from each other, that is when the tanks are not drained uniformly. In such case the currents through the heater coils are at variance and the coils are heated differently.

The heater coils 51 and 57 coact with bellows type elements 60 and 61 respectively. Each bellows has an extension 62 and 63 respectively, about which heater coils 51 and 57 are wound. The extensions 62 and 63 may be hollow to accelerate the transfer of heat from the extensions to the liquid in the bellows. It is, of course, also possible to wind the heater coils about the main chamber of the bellows or to transmit the heat generated by the heater coils to the bellows by any other suitable means. The bellows are pivotally supported on fixed pivots 64 and 65 respectively. They are either totally filled or filled with a volatile liquid, so that a vapor space is created in extension chambers 62 and 63. When the bellows are filled with a volatile liquid, the connection between the bellows and the respective extension chambers is so arranged that a vapor space forms in the warmer extension chambers 62 and 63. Under certain circumstances the use of volatile liquid filled bellows is preferable since such bellows show a greater rate of expansion or contraction in response to a given change of temperature of the bellows. The temperature of the bellows and hence the expansion and contraction thereof is controlled by the heat generated by heater coils 51 and 57, which in turn are controlled by the liquid level changes in tanks 1 and 2 as previously explained. It has been found that the contraction and expansion of the bellows in response to a given change of heat generated is influenced to a certain degree by the altitude, one reason being the lowering of the heat radiated at higher altitudes.

In order to compensate for differences in the reaction of the bellows at different altitudes and to secure a more uniform expansion or contraction, shunt resistors generally designated 70 and 71 may be provided. Altitude shunt 70 comprises a resistance element 72 and a slider contact 73. The relative position of the slider 73 is controlled by the expansion and contraction of an evacuated bellows 74 stationarily supported. Bellows 74 will be more or less compressed in response to the varying air pressure at different altitudes and regulate the resistance element 72 parallel to heater coil 57 correspondingly, thereby compensating the influence of the altitude upon the reaction of bellows 61.

Similarly, altitude shunt 71 comprises a resistance element 75, a slider contact 76 and a stationarily supported evacuated bellows 77. Instead of employing automatically controlled altitude shunts it is, of course, also possible to provide manually adjustable shunts such as variable resistors.

Each bellows 60 or 61 is pivotally connected to a temperature compensation link 80 pivotally supported at a point 81 by an arm 82 which is pivoted on a fixed pivot 83. Arm 82 is extended to form a pointer 84 which cooperates with a stationary scale 85. Pointer and scale positions are so arranged and selected that the pointer will be in the center position of the scale (position as shown in the figure) when the liquid levels in both tanks are equal and will deviate toward the left or right section of the scale in response to unequal liquid levels due to one or the other of the tanks draining at a faster rate. The arm 82 is rigid with an insulation bar 86 having at its ends contact arms 87 and 88. Contact arm 87 is connected by a pigtail 89 and a lead 90 to one terminal of a relay coil 91, the other terminal of said relay coil being connected by a lead 92, a lead 93, a resistor 94, a relay contact point 95 of a second relay, a relay armature contact 96 engaging a back contact point 95 when the relay coil 97 controlling armature contact 96 is deenergized, and a lead 99 to ground. Similarly, contact arm 88 is connected by a pigtail 100, a lead 101 to one terminal of relay coil 97, the other terminal of said relay coil being connected by a lead 102, a resistor 103, a contact point 104 of relay 91, an armature contact 105 controlled by relay 91 and engaging back contact point 104 when relay 91 is deenergized, and a lead 107 to ground.

Contact arms 87, 88, preferably made of flexible material, coact with two sets of contacts 110, 111 for contact arm 87 and 112, 113 for contact arm 88 respectively. Contacts 110 and 111 are connected by leads 114, 115 respectively to supply lead 44. Contact 112 is connected by a lead 116 to leads 92 and 93, and contact 113 is connected by lead 117 to lead 102.

Link 80 and arm 82 are so arranged and constructed that insulation bar 86 is in a position in which contact arms 87 and 88 simultaneously engage contacts 112, 113 respectively when both bellows 60 and 61 are uniformly heated and hence are expanded or contracted to the same extent. It will be readily seen that in this position of the contact arms relay coils 91 and 97 are short-circuited, the short-circuit of relay coil 91 may be easily traced from one terminal of relay coil 91 through leads 92, 116, contact 112, contact arm 87, pigtail 89, and lead 90 to the other terminal of relay coil 91, and the short-circuit of relay coil 97 from one terminal thereof through leads 102, 117, contact 113, contact arm 88, pigtail 100 and lead 101 to the other terminal of this relay coil. Armature contact 105 of relay 91 engages a fixed relay contact 120, when the relay coil 91 is energized and second armature contact 121 of relay 91 engages a fixed relay contact 122 when the relay coil 91 is energized.

Similarly, armature contact 96 of relay 97 engages a fixed relay contact 125 when the relay coil 97 is energized and a second armature contact 126 controlled by relay coil 97 engages a fixed contact point 127 when the relay coil 97 is energized.

Contact point 120 is connected by a lead 128 to one terminal of electromagnet coil 8 controlling valve 6, the other terminal of this coil being connected to supply lead 44 as previously mentioned. Armature contact 121 is connected by a lead 129 to supply lead 44, and contact point 122 is connected by a lead 130 to lead 90 extended to contact arm 87.

Contact point 125 of relay 97 is connected by a lead 131 to one terminal of electromagnet coil 9 controlling valve 7, the other terminal of this coil being connected to supply lead 44 as previously mentioned. Armature contact 126 is connected by a lead 132 to supply lead 44, and contact point 127 is connected by a lead 133 to lead 101 extended to contact arm 88.

One of the purposes of providing relays 91 and 97 for controlling the circuit connections of coils 8 and 9 rather than to control coils 8 and 9 directly by contact arms 87, 88 and the contacts coacting therewith is to protect these contacts and the contact arms against the comparatively high currents required for the operation of coils 8 and 9. Relays 91 and 97 may therefore be described as power relays. However, it should be understood in this connection that under certain circumstances the power relays may be omitted and the valve actuating coils 8 and 9 be controlled directly by the contact arms 87 and 88.

The valve actuating coils 8 and 9 and the valves 6 and 7 controlled thereby are so designed that the valves are open permitting a drainage of tanks 1 and 2 through pipes 4 and 5 when coils 8 and 9 are deenergized. As a result, in case of power failure, both tanks will continue to drain.

The operation of a control device or system as hereinbefore described is as follows:

Let it be assumed that control switch 43 is closed, thereby rendering the control device operative and that tanks 1 and 2 drain uniformly so that the relative liquid levels in the tanks remain unchanged. Then, as previously described, change of the resistances of resistance elements 10 and 11 in response to the liquid level change in tank 1 will be compensated by corresponding changes of the resistances of resistance elements 12 and 13 in response to a liquid level change in tank 2. Consequently, heater coils 51 and 57 will be equally heated and the bellows elements controlled thereby will expand or contract to the same extent. Such expansion or contraction of the bellows will cause a rotation of temperature compensating link 80 about pivot 81, but the position of arm 82 will remain unchanged. Pointer 84 will remain in the illustrated center position, thereby indicating that both tanks drain uniformly. Relay coils 91 and 97 are short-circuited by the engagement between contact arms 87, 88 respectively and contacts 112, 113 respectively as previously explained. Coils 8 and 9 are deenergized and valves 6, 7 are completely or partly opened according to the adjustment of the valves.

Let it now be assumed that the two tanks drain at a different rate, for instance, that tank 2 drains faster than tank 1. Then, the resistance changes in response to the liquid level changes are no longer compensating and one of the heater coils will be heated more than the other. Under these circumstances the float and linkage systems displacing the respective sliders are so arranged that heater coil 51 is now heated more than heater coil 57. Then, bellows 60 will expand more than bellows 61. This differential heating of the bellows will impart a rotative movement to link 80 and also displace pivot 81 toward the left, thereby swinging arm 82 about its pivot 83, provided, of course that the difference in the heating of the two bellows exceeds a certain minimum. The difference in heating of the bellows to which the control device responds can be adjusted by proper selection of the lengths of the various links and arms and of the distances between contacts 110, 112 and 111, 113 respectively. The swinging movement of arm 82, will cause insulation bar 86 to disengage contact arm 88 from contact 113 and to move it into engagement with contact 111. Contact arm 87 and contact 112 remain in engagement, the resilience of the contact arms 87, 88 allowing such movement of bar 86. Consequently, relay coil 91 remains short-circuited and an energizing circuit for relay coil 97 is established which may be easily traced from the supply lead 44 through lead 115, contact 111, contact arm 88, pigtail 100, lead 101, coil 97, lead 102, resistor 103, contact 104, armature 105 of deenergized relay 91, and lead 107 to ground. Relay 97 now attracts its armature contacts 96 and 126 into engagement with contact points 125 and 127 respectively. Consequently, a relay holding circuit is closed which may be traced from supply lead 44 through lead 132, armature 126, contact 127, lead 133 and lead 101, and is then continued as previously described. The purpose of this holding circuit is to retain relay 97 energized when contact arm 88 and contact 111 are temporarily disengaged, for instance, due to vibrations after contact between arm 88 and contact 111 has been once established and relay 97 has responded. The energization of relay 97 further closes a circuit for coil 9 which may be traced from supply lead 44 through coil 9, lead 131, contact 125, armature contact 96, and lead 99 to ground. Consequently, coil 9 is energized and closes the valve 7 more or less as adjusted, thereby reducing the rate of flow at which tank 2 is drained. The displacement of pivot 81 will move pointer 84 into the section of scale 85 assigned to tank 1 thereby indicating that tank 1 is the one which drains slower than the other tank.

As soon as the liquid levels in the tanks are equalized, the effective resistances of the resistance elements will again compensate each other. Consequently, both heater coils 51 and 56 will be heated equally and hence both bellows will be expanded to the same extent. Arm 82 and with it the contact arms and pointer 84 now return into the position shown in the drawings in which both relay coils 91, 97 are short-circuited and coils 8 and 9 are deenergized.

It should be noted that in the event both contact arms 87, 88 engage the respective contacts 110, 111 simultaneously due to some defect in the system, the circuit arrangement prevents any energization of both relays 91, 97 thereby shutting off both tanks since the energization of one relay will always interrupt the circuit of the other at contacts 104 or 95.

The operation of the control device is the same when tank 2 drains slower than tank 1, the only difference being that then coils 91 and 8 are energized in a manner which will be easily understood from the previous description.

The invention has been described in connection with an embodiment in which the rate of flow of the faster draining tank is reduced. However, it should be understood that it is quite practical to reverse this arrangement and to increase the valve opening of the slower draining tank. This can be accomplished by simply adjusting valves 6 and 7 accordingly.

A differential draining of tanks 1 and 2 may be caused by a variety or reasons such as unequal fuel consumption of engines fed from the tanks, by friction in the feeder pipes, etc.

While the invention has been described in detail with respect to a certain now preferred example and embodiment of the invention, it will be understood by those skilled in the art after understanding the invention, that various changes and modifications may be made without departing from the spirit and scope of the invention and it is intended therefore, to cover all such changes and modifications in the appended claims.

What is claimed is:

1. A control system for supervising the discharge of liquid from two tanks to maintain a predetermined condition of relative liquid levels therein, comprising means responsive to liquid level in each of said tanks respectively, a mechanical differential means having movable elements respectively actuated by said liquid level responsive means and having a member movable in one direction or the other by said elements in response to difference between the liquid levels in said tanks and said predetermined condition, but maintained against movement as long as said levels are substantialliy in said predetermined condition, valve means for controlling the discharge of liquid from said tanks respectively, and electrical means controlled by the position of said member for selectively actuating said valve means in such manner as will tend to re-establish said predetermined condition of the levels in said tanks.

2. A control system in accordance with claim 1, wherein said valve means are solenoid operated valves so arranged that said valves are open when their actuating solenoids are de-energized, and wherein said electrical means controlled by the position of said member is effective selectively to energize the solenoid associated with the valve controlling the discharge of liquid from the one of said tanks having the lower liquid level therein in respect to said predetermined condition so as at least partially to close such valve until the levels in the two tanks are substantially re-established at said predetermined condition.

3. A control system for supervising the discharge of liquid from two tanks to maintain a predetermined condition of relative liquid levels therein, comprising means responsive to liquid level in each of said tanks respectively, a first electric circuit including current affecting means controlled respectively and oppositely by said liquid level responsive means in said tanks respectively for controlling the flow of electric current in said first circuit, a second electric circuit similar to said first circuit but oppositely connected to each of said liquid level responsive means for controlling the flow of electric current in said second circuit, both said circuits being so constructed and arranged that the currents flowing therethrough will be substantially equal throughout the range of liquid level variation from full to empty in said tanks respectively as long as the levels in said tanks are substantially at said predetermined condition, but said currents will be different from one another if the levels of liquid in said tanks differ substantially from said predetermined condition, a valve controlling the discharge of liquid from each of said tanks, and means responsive to a difference of the values of said currents, but substantially independent of simultaneous changes in both said values, for selectively actuating said valves in a manner tending to re-establish said predetermined condition of the liquid levels in said tanks.

4. A control system in accordance with claim 3, wherein said means responsive to a difference of the values of said currents comprises mechanical differential means responsive to the currents flowing in said electric circuits, a member controlled in position by said mechanical differential means and movable thereby in one direction or the other in response to an unbalance of said mechanical differential means, and electrical means responsive to the posiiton of said member for selectively actuating said valves at least to reduce the discharge from the one of said tanks having the lower liquid level therein in respect to said predetermined condition.

5. A control system in accordance with claim 3, wherein said means responsive to a difference of the values of said currents comprises fluid-containing bellows, means responsive to the currents flowing in said electric circuits for controlling the expansion of the fluid in said bellows respectively, means mechanically interconnected to both said bellows and articulated to a movable member for controlling the position of said member in response to differential expansion of said bellows, and electrical means responsive to the position of said member for selectively controlling said valves in a manner tending at least to restrict the flow of liquid through the valve controlling the discharge from the one of said tanks having the lower liquid level therein in respect to said predetermined condition.

6. A control system for supervising the discharge of liquid from two tanks to maintain a predetermined condition of relative liquid levels therein, comprising means responsive to liquid level in each of said tanks respectively, a first electrical circuit including rheostat resistances controlled respectively and oppositely by said liquid level responsive means in said tanks respectively for controlling the flow of electric current in said first circuit, a second electric circuit similar to said first circuit and including rheostat resistances oppositely connected to each of said liquid level responsive means respectively for controlling the flow of electric current in said second circuit, both said circuits being so constructed and arranged that the currents flowing therethrough will be substantially equal throughout the range of liquid level variation from full to empty in said tanks respectively as long as the liquid levels in said tanks remain substantially in said predetermined condition, but said currents will be different from one another if the levels of the liquid in said tanks differ substantially from said predetermined condition, a pair of fluid-containing bellows, electric heating means in said electric circuits respectively associated with said bellows for heating the fluid therein and thereby for controlling the expansion of said bellows in response to the currents flowing in said circuits respectively, means mechanically interconnected to both said bellows and including a movable member articulated thereto for controlling the position of said member in response to differential expansion of said bellows, a valve controlling the discharge of liquid from each of said tanks respectively, and electrical means responsive to the position of said member for selectively controlling said valves in a manner tending to re-establish said predetermined condition of the liquid levels in said tanks.

7. In an electrical control device for controlling the discharge of liquids from two tanks to maintain a predetermined condition of relative liquid levels therein, in combination, a valve means for regulating the flow of liquid from each of said tanks, an electrical control means connected with said valve means for controlling each of said valve means independently, a differential relay means comprising two temperature sensitive members, a switch means controlled by the relative temperature of said members, a plurality of resistors associated with each of said tanks, each of said resistors comprising a resistance element and a movable contact element engaging the resistance element, a float and linkage system provided for each tank, each of said systems being controlled by the liquid level in the respective tank and operatively connected with the movable element of the resistor associated wtih the respective tank for relative movement of the respective elements, a heater resistor provided for each temperature sensitive member, a circuit means for connecting each heater resistor with one of the variable resistors of each of said tanks and a source of current, said float and linkage systems being constructed to displace the respective elements relative to each other to cause an increase of the resistance of a variable resistor associated with one tank and a decrease of the resistance of the corresponding variable resistor associated with the other tank in such a manner that the total resistance included in a heater resistor circuit remains unchanged in response to uniform liquid level changes in the tanks and is changed in response to a change in the relative liquid levels in the tanks from said predetermined condition, thereby causing unequal heating of the temperature sensitive members by the heater resistors, and a second circuit means for connecting the switch means with the electrical control means and a source of current, said temperature sensitive members being constructed to move the switch means into a position in which the control means are energized when and while the temperature sensitive members have unequal temperatures, said control means being arranged to regulate the valve means toward re-establishing said predetermined condition of the liquid levels in said tanks when energized.

8. In an electrical control device for controlling the discharge of liquid from two tanks to maintain a predetermined condition of relative liquid levels therein, in combination a valve means for each of said tanks, an electrical control means provided for each valve means for controlling the operation thereof, a differential relay means comprising two temperature sensitive members, a switch means controlled by the relative temperature of said members, a plurality of variable resistance means associated with each of said tanks, a prime mover for each tank, each of said prime movers being controlled by the liquid level in one of the tanks respectively and controlling the resistance value of the resistance means associated with the respective tank, a heater resistor for each temperature sensitive member respectively, a circuit means electrically interconnecting said heater resistors with said resistance means and a source of current, and a second circuit means electrically interconnecting said switch means with each of said control means and a source of current for energizing the control means through the switch means in response to a difference in the temperature of the temperature sensitive members, said resistance means being constructed and adjusted to include an equal resistance in the circuit connections of each heater resistor in response to said predetermined condition of the relative liquid levels in said tanks, thereby causing equal temperatures of the temperature sensitive members, and to include unequal resistances in the circuit connections of the heater resistors in response to a substantial variation from said predetermined condition of the liquid levels, thereby causing different temperatures of the temperature sensitive members for energizing the control means provided for the tank in which there is a lower liquid level in respect to said predetermined condition so as at least to reduce the rate of discharge therefrom until said predetermined condition is re-established.

9. In an electrical control device for controlling the discharge of liquid from two tanks to maintain a predetermined condition of relative liquid levels therein, in combination, a valve means for regulating the flow of liquid from each of said tanks, an electrical control means provided for each valve means for controlling the operation thereof, a differential relay means comprising two temperature sensitive members, a switch means controlled by the relative temperature of said members, a plurality of variable resistors associated with each of said tanks, each of said resistors comprising a resistance element and a movable contact element engaging the resistance element, a float and linkage system provided for each tank, each of said systems being controlled by the liquid level in one of said tanks respectively and operatively connected with the movable element of the resistors associated with the respective tanks for relative movement of the respective elements, a heater resistor provided for each temperature sensitive member, a circuit means for connecting each heater resistor with one of the variable resistors of each of said tanks and a source of current, said float and linkage systems being constructed to displace the respective elements relative to each other to cause an increase of the resistance of a variable resistor associated with one tank and a decrease of the resistance of the corresponding variable resistor associated with the other tank in such a manner that the total resistance included in a heater resistor circuit remains unchanged in response to uniform liquid level changes in said tanks and said total resistance being changed in response to substantial variations of the liquid levels in said tanks from said predetermined condition, thereby causing unequal heating of the temperature sensitive members by the heater resistors, and a second circuit means for connecting said switch means with each of said electrical control means and a source of current, said temperature sensitive members being constructed to move the switch means into a position in which all the control means are deenergized when the resistances included in the heater resistor circuits are equal and into a position in which a predetermined one of said control means is energized when said temperature sensitive means are differentially heated respectively, each of said control means being arranged to regulate the respective valve means toward re-establishing said predetermined condition of the liquid levels in the tanks when energized.

10. An electrical control device as described in claim 6 in combination with a plurality of adjustable resistance means each connected in shunt to one of said electric heating means.

11. An electrical control device according to claim 6, wherein said electrical means responsive to the position of said member for selectively controlling said valves includes switch means mechanically controlled by the position of said member for selectively controlling current flow through a pair of primary circuits for said valves respectively, relay means in said primary circuits controlling current flow through secondary circuits for said valves respectively, and electrical means in said secondary circuits for directly controlling said valves, each of said valves and the operating means therefor being constructed and arranged to allow full discharge from the respectively associated tank when there is no electric current flowing in said secondary circuits respectively.

12. A control system in accordance with claim 1, comprising in addition, indicating means mechanically controlled by said movable elements of said mechanical differential means for indicating the presence and direction of a departure of the relative liquid levels in said tanks from said predetermined condition.

13. In an apparatus of the character described to maintain a predetermined condition of relative liquid levels in two tanks, two liquid fuel supply tanks, a valve for each tank operable to regulate the flow of fuel from its tank, an electrical means for operating each valve, a float in each tank controlling the electrical means and the valve associated with the tank, and electrical means rendered effective by a departure of the relative liquid levels in said tanks from said predetermined condition for putting said valves and their electrical operating means under the joint control of said floats to regulate the valves toward re-establishing said predetermined condition of the liquid levels in said tanks.

CLARENCE A. DE GIERS.
ROLF A. F. SANDBERG.

REFERENCES CITED

The following references are of record in the file of this patent:

UNITED STATES PATENTS

| Number | Name | Date |
|---|---|---|
| 1,804,212 | De Giers | May 5, 1931 |
| 1,886,439 | Wells | Nov. 8, 1932 |
| 1,983,093 | Montgomery | Dec. 4, 1934 |
| 2,029,085 | Sussin | Jan. 28, 1936 |

FOREIGN PATENTS

| Number | Country | Date |
|---|---|---|
| 349,787 | Germany | Mar. 8, 1922 |